United States Patent [19]

Ericksen

[11] Patent Number: 4,750,271
[45] Date of Patent: Jun. 14, 1988

[54] TEMPLATE FOR LOCATING ELECTRICAL OUTLET BOXES

[76] Inventor: Eric L. Ericksen, P.O. Box 121, Twin Lakes, Wis. 53181

[21] Appl. No.: 98,850

[22] Filed: Sep. 21, 1987

[51] Int. Cl.$^4$ .......................... B25B 3/00; B25B 11/00
[52] U.S. Cl. .................................. 33/613; 33/DIG. 10; 269/904
[58] Field of Search ......... 33/528, 562, 613, DIG. 10; 269/63, 254 CS, 904

[56] References Cited

U.S. PATENT DOCUMENTS

| | | | |
|---|---|---|---|
| 2,956,798 | 10/1960 | Briggs | 269/190 |
| 2,962,281 | 11/1960 | Hodgson | 269/190 |
| 2,990,172 | 6/1961 | Gianotta | 269/116 |
| 3,436,070 | 4/1969 | Utley et al. | 33/DIG. 10 |
| 3,601,386 | 8/1971 | Estep | 269/6 |
| 3,751,026 | 8/1973 | Stickney | 269/904 |
| 3,875,669 | 4/1975 | Hull | 33/180 |
| 3,954,717 | 5/1976 | Tarr | 269/82 |
| 4,181,295 | 1/1980 | Duffy | 269/904 |
| 4,290,591 | 9/1981 | Smith | 269/6 |
| 4,479,639 | 10/1984 | Kane | 33/613 |

*Primary Examiner*—Richard R. Stearns
*Attorney, Agent, or Firm*—Michael, Best & Friedrich

[57] ABSTRACT

A template for use in positioning an electrical outlet box or switch box with respect to a building stud. The template releaseably supports the electrical box at a selected height and position forwardly of the face of the vertical stud.

16 Claims, 1 Drawing Sheet

U.S. Patent
Jun. 14, 1988
4,750,271
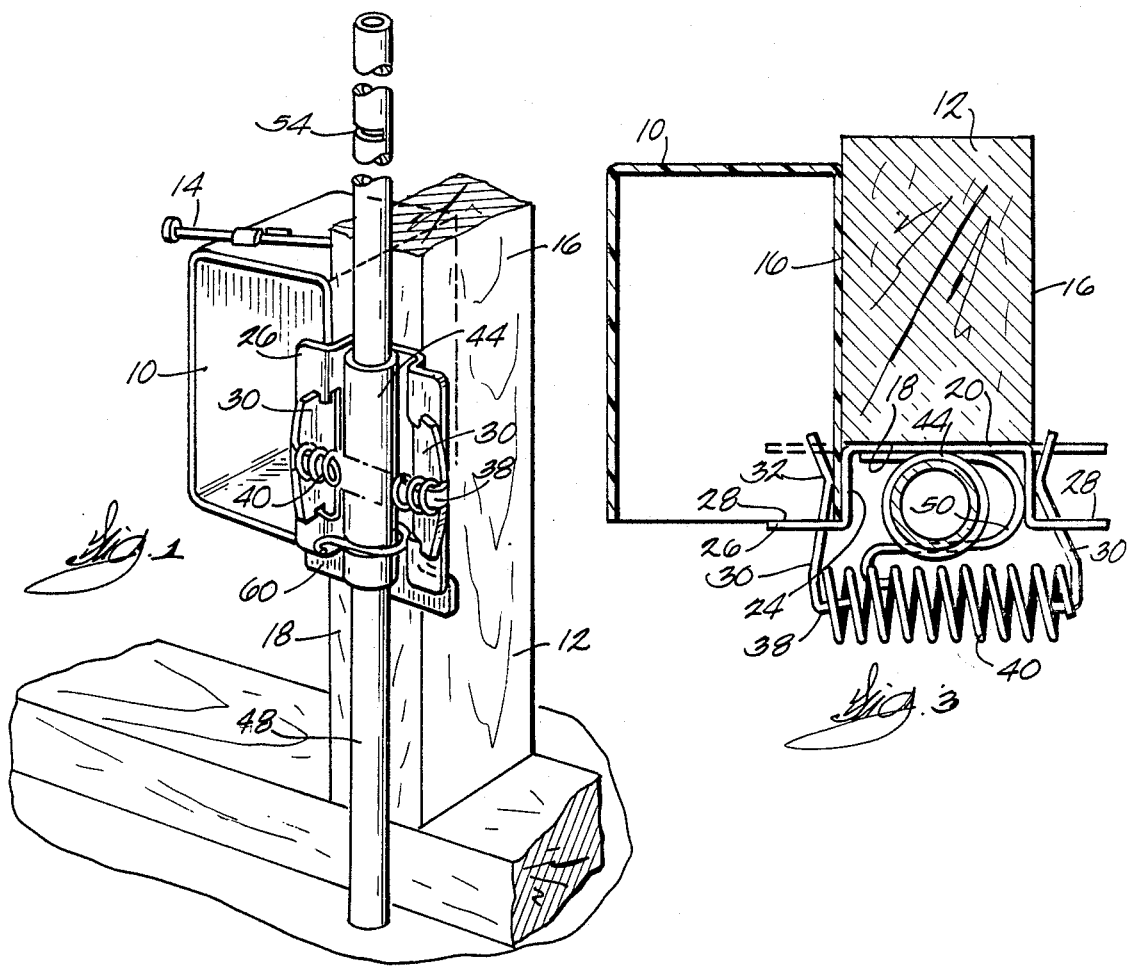
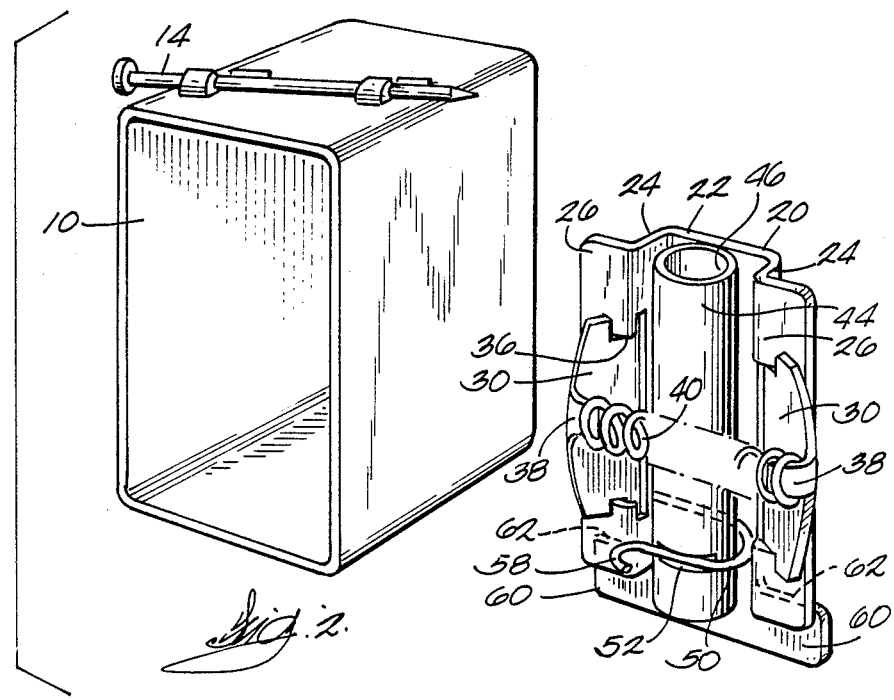

TEMPLATE FOR LOCATING ELECTRICAL OUTLET BOXES

FIELD OF THE INVENTION

The invention relates to templates for positioning electrical switch boxes and outlet boxes such that the electrical boxes can be mounted in the proper position during construction.

BACKGROUND PRIOR ART

Prior art devices for positioning electrical switch and outlet boxes are illustrated in the Briggs U.S. Pat. No. 2,956,798, issued Oct. 18, 1960; the Hodgson U.S. Pat. No. 2,962,281, issued Nov. 29, 1960; the Gianota U.S. Pat. No. 2,990,172, issued June 27, 1961; and the Estep U.S. Pat. No. 3,601,386, issued Aug. 24, 1971. Attention is also directed to the Hull U.S. Pat. No. 3,875,669, issued Apr. 8, 1975; the Smith U.S. Pat. No. 4,290,591, issued Sept. 22, 1981; and the Tarr U.S. Pat. No. 3,954,717, issued May 4, 1976.

SUMMARY OF THE INVENTION

The present invention comprises an improved template for use in mounting an electrical outlet box or electrical switch box. The apparatus embodying the invention includes an improved means for mounting the outlet boxes and the like such that they can be conveniently positioned in a proper location with respect to a vertical stud and conveniently nailed in place or otherwise fastened to the stud. The template also provides means for mounting the box at a uniform height on a vertically extending stud and in a proper fore and aft position with respect to the forward face of the stud. The template also includes an improved means for releaseably gripping the outlet box such that it can be conveniently inserted into the template and the template easily removed once the electrical box is fixed in place.

Various features and advantages of the invention will be apparent from the following description of a preferred embodiment, from the drawings and from the claims.

BRIEF DESCRIPTION OF THE DRAWINGS

FIG. 1 is a perspective view of an apparatus embodying the invention and supporting an electrical outlet box adjacent a vertical stud.

FIG. 2 is a plan view of the apparatus illustrated in FIG. 1.

FIG. 3 is an enlarged exploded view of apparatus illustrated in FIG. 1.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus embodying the invention and for use in positioning an electrical outlet or switch box 10 against a vertical stud 12 in the proper orientation such that the outlet box can be secured by nails 14 to the side 16 of the vertical stud and such that the outlet box 10 is in the desired vertical position and is positioned forwardly with respect to the stud 12 at a proper forward spacing with respect to the vertical forward face 18 of the stud.

The apparatus embodying the invention includes a base or a base plate 20 adapted to be positioned against the forward face 18 of the stud 12, the base including a channel portion defined by a planar rear wall 22 and a pair of spaced apart sidewalls 24 extending forwardly from the sides of the rear wall 22. The base 20 also includes a pair of flanges or ears 26 projecting outwardly from the forward portions of the sidewalls 24, each of the flanges 26 being planar and having rearward planar surfaces 28 perpendicular to the sidewalls 24 of the base. The planar rear wall 22 has a planar rearward surface adapted to engage the forward face 18 of the stud 12 and has a width approximately equal to the width of the stud. The flanges 26 are spaced forwardly from the rear wall 22 by a distance approximately equal to the desired distance between the forward face of the stud 12 and the forward face of the outlet box 10 to be secured to the stud.

Means are also provided for securing outlet boxes to one or both of the sidewalls 24 of the base plate 20, and as to each outlet box, a portion of the face of the outlet box is positioned against the rearward surface 28 of one of the flanges 26 of the base. In the illustrated arrangement, the means for securing the outlet box 10 in place includes a pair of clamp members 30, one of the clamp members 30 being positioned on one side of the base and another of the clamp members being positioned on an opposite side of the base. Each of the clamp members 30 is pivotally joined to the base adjacent a forward portion of the sidewall 24 and is pivotally movable such that a rearward portion 32 of the clamp member is movable toward and away from the outside surface of the sidewall 24. More particularly, in the illustrated arrangement, each of the outwardly extending flanges 26 includes an elongated vertically extending slot 36 adapted to house a central portion of one of the clamp members 30 so as to pivotally support that clamp member. Means are also provided for resiliently biasing the ends 32 of the clamp members into clamping engagement with the sidewalls 24 of the base. In the illustrated arrangement, each clamp member 30 includes a forwardly projecting end 38, and a compression spring 40 is provided between the forward projecting ends 38 of the pair of clamp members 30 for forcing them outwardly away from one another.

Means are also provided for supporting the base 20 and the clamp members 30 for vertical adjustable movement with respect to the vertical stud 12 and such that the outlet box 10 is supported in the proper vertical position on the stud 12. The supporting means includes a central vertically extending sleeve or tube 44 fixed to a central portion of the planar rear wall 22 of the base 20 and having a vertical longitudinal axis. In one form of the invention, the sleeve 44 can be welded to the rear wall 22 equidistant the sidewalls 24 of the base. The sleeve 44 includes central bore 46 adapted to slideably house a linear vertically extending support pipe or tube 48 and such that the base 20 is slideably supported on the pipe or tube 48 for selective vertical movement. Detent means are also provided for releaseably supporting the base 20 on the tube 48 in a selected vertical position. In the illustrated arrangement, the detent means includes a spring or clip 50 surrounding a portion of the sleeve 44 and including a portion housed in a horizontal slot 52 cut in the sleeve 44. The vertical pipe 48 can include one or more complementary horizontal slots 54 cut into its surface and adapted to house the spring 50 when the base 20 is in the selected vertical position on the pipe 48. In operation, if the free end 58 of the spring 50 is pulled outwardly away from the pipe 48, the sleeve 44 and base 20 will be freely slideably movable on the vertical pipe 48.

Means are also provided for positioning the outlet box 10 vertically with respect to the base 20. This means includes a pair of tabs 60 extending outwardly from a lower portion of the rear wall 22 and being generally coplanar with the rear wall. The tabs 60 each include an upper surface 62 adapted to support the bottom of the outlet box 10 when the outlet box 10 is held in place by one of the clamp members 30.

In operation of the apparatus shown in the drawings, an outlet box or switch box 10 can be inserted between the end 32 of a clamp member 30 and the opposed sidewall 24 of the base 20 and with the bottom of the outlet box positioned on the upper edge 62 of one of the outwardly projecting tabs 60. The rear wall 22 of the base 22 is then positioned against the forward face 18 of the stud 12 and with a side 16 of the outlet box positioned against a side of the vertical stud. The nails 14 in the upper surface of the outlet box 10 can be driven into the stud 12 to secure the outlet box in place.

Various features of the invention are set forth in the following claims.

I claim:

1. An apparatus for use in positioning an electrical box such that the electrical box can be secured in place by fasteners, the electrical box including a pair of opposed sidewalls, a bottom and an open face, the apparatus for positioning the electrical box including:
   a base including a channel having a rear wall and a pair of spaced apart sidewalls projecting forwardly from the rear wall, a first flange projecting outwardly from a forward edge of one of the sidewalls, the flange having a rearward surface,
   means for releaseably clampingly engaging an electrical box, the means for clampingly engaging including a clamp member supported by the base, the clamp member including a portion movable toward and away from a sidewall of the base to releaseably clamp a sidewall of the electrical box against the sidewall of the base,
   spring means for biasing the clamp member into engagement with the sidewall of the electrical box, and
   means for supporting the base in elevated relation, the means for supporting the base including a vertical support member.

2. An apparatus as set forth in claim 1 wherein the clamp member engages the sidewall of the electrical box such that the electrical box is positioned against the sidewall of the base and against the rear wall of the first flange.

3. Apparatus as set forth in claim 1 and further including a vertically extending sleeve or tube fixed to the base between the sidewalls, the vertical support member housed in the sleeve, the sleeve and base being supported on the vertical support member for selective vertical slideable movement, and detent means for releaseably locking the sleeve in a predetermined position on the vertical support member.

4. An apparatus as set forth in claim 3 wherein the detent means includes a notch formed in the vertical support member and spring means supported by the sleeve and engageable with the notch.

5. Apparatus as set forth in claim 1 wherein the base further includes a lower portion, and further including a pair of flanges projecting outwardly from opposite sides of the lower portion of the base, the flanges being generally coplanar with the base, and the flanges each having an upper surface portion adapted to support the bottom of the electrical box when the electrical box is positioned against the sidewall of the base and against the rearward surface of the first flange.

6. Apparatus as set forth in claim 1 and further including means for supporting the clamp member for movement between a clamping position wherein the clamp member secures an electrical box against a sidewall of the base and a release position, the means for supporting the clamp member including a vertically extending slot in the base and housing a portion of the clamp member.

7. Apparatus as set forth in claim 1 and further including a second flange projecting outwardly from a forward portion of a second sidewall, the second flange having a rearward surface adapted to support an electrical box on an opposite side of the base, and a second clamp member supported for pivotal movement between a position wherein the second clamp member can engage an electrical box and a release position.

8. Apparatus as set forth in claim 7 wherein said spring means comprises a compression spring positioned between said clamp members and applying outward force on said clamp members away from one another.

9. An apparatus for use in positioning an electrical box against a vertical stud having vertical sides and a planar face and such that the electrical box can be secured in place against a side of the stud by fasteners, the electrical box including a pair of opposed sidewalls, a bottom and a face, the face of the electrical box being positioned forwardly of the planar face of the stud, the apparatus for positioning the electrical box including:
   a base including a channel having a rear wall adapted to be positioned against the planar face of the stud, the rear wall having a width approximately equal to the width of the face of the stud, and a pair of spaced apart sidewalls projecting forwardly from the rear wall, a first flange projecting outwardly from a forward edge of one of the sidewalls, the flange having a rearward surface, the rearward surface being spaced forwardly of the face of the stud,
   means for releaseably clampingly engaging an electrical box such that a sidewall of the electrical box will be positioned against one of the vertical sides of the stud and with a portion of the face of the electrical box positioned against the rearward surface of the flange, the means for clampingly engaging including a clamp member supported by the base, the clamp member including a portion movable toward and away from a sidewall of the base to releaseably clamp a sidewall of the electrical box against the sidewall of the base,
   spring means for biasing the clamp member into engagement with the sidewall of the electrical box, and means for supporting the base in elevated relation, the means for supporting the base including a vertical support member.

10. An apparatus as set forth in claim 9 wherein the clamp member engages the sidewall of the electrical box such that the electrical box is positioned against the sidewall of the base and against the rear wall of the first flange.

11. Apparatus as set forth in claim 9 and further including a vertically extending sleeve or tube fixed to the base between the sidewalls, the vertical support member housed in the sleeve, the sleeve and base being supported on the vertical support member for selective vertical slideable movement, and detent means for releaseably locking the sleeve in a predetermined position on the vertical support member.

12. An apparatus as set forth in claim 11 wherein the detent means includes a notch formed in the vertical support member and spring means supported by the sleeve and engageable with the notch.

13. Apparatus as set forth in claim 9 wherein the base further includes a lower portion, and further including a pair of flanges projecting outwardly from opposite sides of the lower portion of the base, the flanges being generally coplanar with the base, and the flanges each having an upper surface portion adapted to support the bottom of the electrical box when the electrical box is positioned against the sidewall of the base and against the rearward surface of the first flange.

14. Apparatus as set forth in claim 9 and further including means for supporting the clamp member for movement between a clamping position wherein the clamp member secures an electrical box against a sidewall of the base and a release position, the means for supporting the clamp member including a vertically extending slot in the base and housing a portion of the clamp member.

15. Apparatus as set forth in claim 9 and further including a second flange projecting outwardly from a forward portion of a second sidewall, the second flange having a rearward surface adapted to support an electrical box on an opposite side of the base, and a second clamp member supported for pivotal movement between a position wherein the second clamp member can engage an electrical box and a release position.

16. Apparatus as set forth in claim 15 wherein said spring means comprises a compression spring positioned between said clamp members and applying outward force on said clamp members away from one another.

* * * * *